United States Patent [19]
Levesque

[11] Patent Number: 6,100,670
[45] Date of Patent: Aug. 8, 2000

[54] MULTI-FUNCTIONAL BATTERY MANAGEMENT MODULE OPERABLE IN A CHARGING MODE AND A BATTERY PACK MODE

[75] Inventor: Chris Levesque, Fountain Valley, Calif.

[73] Assignee: Conexant Systems, Inc., Newport Beach, Calif.

[21] Appl. No.: 09/060,425

[22] Filed: Apr. 14, 1998

[51] Int. Cl.[7] .................................................. H02J 7/04
[52] U.S. Cl. .......................................... 320/150; 320/137
[58] Field of Search ................................... 320/150, 151, 320/152, 154, 118, 127, 135, 136

[56] References Cited

U.S. PATENT DOCUMENTS

| | | | |
|---|---|---|---|
| 4,992,720 | 2/1991 | Hata | 320/133 |
| 5,432,429 | 7/1995 | Armstrong, II et al. | 320/136 |
| 5,438,252 | 8/1995 | Perelle | 320/149 |
| 5,488,284 | 1/1996 | Dias et al. | 320/162 |
| 5,523,667 | 6/1996 | Feldstein | 320/118 |
| 5,541,489 | 7/1996 | Dunstan | 320/152 |
| 5,606,242 | 2/1997 | Hull et al. | 320/151 |
| 5,646,501 | 7/1997 | Fishman et al. | 320/112 |
| 5,684,384 | 11/1997 | Barkat et al. | 320/150 |
| 5,701,597 | 12/1997 | Nakanishi et al. | 455/127 |

FOREIGN PATENT DOCUMENTS

| | | | |
|---|---|---|---|
| 0364371 | 4/1990 | European Pat. Off. . | |
| 09140066 | 5/1997 | European Pat. Off. . | |
| 4215199 | 12/1992 | Germany | 327/530 |
| WO 9508222 | 3/1995 | WIPO . | |

OTHER PUBLICATIONS

Texas Instruments, "TPS9104 Cellular Subscriber Terminal Power Supply/Audio system Data Sheet Abstract, SLVS133," Aug. 1996.

Intel System Management Bus Specification, Rev.1.0, Feb. 15, 1995.

SGS–Thomson Microelectronics, L6901, Super Smart Battery Charger, Product Preview, Jul. 1997.

International Search Report, Aug. 20, 1999.

Somerville, T.A., "Battery Charger Takes on Two Roles" *EDN Electrical Design News*, Jan. 1, 19998, pp. 84, 86.

*Primary Examiner*—Peter S. Wong
*Assistant Examiner*—Lawrence Luk
*Attorney, Agent, or Firm*—Knobbe, Martens, Olson & Bear LLP

[57] ABSTRACT

A control module which controls battery cells is disclosed which can be used in a charging station, a battery pack and in portable devices such as cellular and cordless phones. The control module comprises a first port configured to connect to a battery cell and an input port configured to connect to an external power supply. Further, the control module comprises a detector module configured to generate a detection signal when the external power supply is connected to the input port, a switching module configured to connect to the input port and the first battery port and to select one of said ports, and a selection module configured to connect to the switching module to receive a signal indicative of an electrical characteristic, and to generating status signals indicative of a charging status. Additionally, the control module has a feedback module associated with the selection module to receive the status signals and to generate a drive signal for controlling input from the external power supply. A processor module is associated with the detection module to receive the detection signal, with the selection module to receive the status signals and with the feedback module to receive the drive signal, and generates control signals to control and terminate charging of the battery cells.

17 Claims, 7 Drawing Sheets

MULTI-FUNCTIONAL BATTERY MANAGEMENT MODULE OPERABLE IN A CHARGING MODE AND A BATTERY PACK MODE

BACKGROUND OF THE INVENTION

This invention relates to energy management systems for battery-operated portable systems, and more specifically to a multi-functional, integrated battery management module for portable phones such as cellular phones.

Battery packs (batteries) for portable devices such as cellular phones or portable computers are typically referred to as either intelligent or non-intelligent battery packs. Intelligent battery packs are designed with a battery charge controller and a battery level indicator circuit (fuel gauge) integral to the battery pack itself. Non-intelligent battery packs are designed such that the battery charge controller and the battery level indicator circuit are integral to the computer system, rather than the battery pack itself.

The battery charge controller is a circuit designed to control the rate of charge to the battery's cells when the battery pack is being recharged via an external source. For example, when the battery pack is fully charged, the battery charge controller reduces the charge to trickle so as to prevent overcharging of the battery pack.

The battery level indicator circuit is a circuit designed to measure the remaining capacity of the battery pack, convert that information into data, and then send that data to a processing unit. This data is typically processed by software running on the processing unit to visually display the battery level, indicating to a user the estimated battery life remaining.

Regardless of whether the battery pack is intelligent or non-intelligent, portable battery packs for cellular or wireless phones are designed to be charged by a charging power supply circuit usually integrated in an external charge station. The charging power supply circuit is a circuit used to convert power from a voltage source into a current source for charging the battery pack. Charging power supplies must be specifically designed to the type of battery technology being used by the system, for example, the cellular phone.

Most battery-operable systems operate on one of three battery technologies, which include Nickel-Cadmium (NiCd), Nickel-Metal Hybrid (NiMH), and Lithium-Ion (Li-Ion). All of these battery cells have their pros and cons. For example, Lithium-Ion battery cells have low weight and high energy, but are relatively expensive. Nickel-Cadmium and Nickel-Metal Hybrids battery cells, on the other hand, have less energy for an equivalent weight, but are also less expensive than Lithium-Ion battery cells.

Particularly for new generations of portable cellular phones, battery related aspects are of significant relevance. Consumers ask for smaller and lighter cellular phones which have an attractive design. Also, the consumers expect highly reliable batteries which require minimal maintenance and offer longer operation time, i.e., longer talk and idle time. However, these are often contradictory requirements. To fulfill these expectations, battery system for new portable phones require battery management solutions that keep the complexity of the system low, and therefore also the cost of the phone.

SUMMARY OF THE INVENTION

The present invention provides a novel battery management system which is suitable for integration on a single chip. This allows implementation of an efficient battery management system into a cellular phone, a battery pack for a cellular phone or into a charging station for a cellular phone. The single-chip battery management system is a multi-functional system that provides, inter alia, battery protection, battery charging, "fuel gauge" and communication with other system components.

The system includes an on-chip processor which can be programmed to allow charging of either NiCd, NiMH or Li-Ion battery cells. The programmability also permits implementation of an advanced charge termination algorithm.

One aspect of the invention involves a control module for controlling battery cells. The control module comprises a first port configured to connect to a first battery cell and an input port configured to connect to an external power supply. Further, the control module comprises a detector module, a switching module and a conversion module. The detector module is configured to generate a detection signal when the external power supply is connected to the input port. The switching module is configured to connect to the input port and the first battery port and to select one of said ports. The conversion module is configured to connect to the switching module to receive a signal indicative of an electrical characteristic, and to generate status signals indicative of a charging status. Additionally, the control module comprises a feedback module and a processor module. The feedback module is configured to be associated with the conversion module to receive the status signals and to generate a drive signal for controlling input from the external power supply. The processor module is configured to be associated with the detection module to receive the detection signal. The conversion module receives the status signals, and the feedback module receives the drive signal. The processor module generates control signals to control and terminate charging of the battery cells.

A further aspect of the invention involves a battery pack comprising such a control module.

Another aspect of the invention involves a charging station for a battery cell. The charging station comprises a power port configured to connect the station to an external power supply, a battery port configured to receive at least one battery cell, a display configured to indicate a charging status of the battery cell, and a control module configured to control the at least one battery cell. The control module comprises a first port configured to connect to the at least one battery cell, an input port configured to connect to the external power supply and a detector module. The detector module is configured to generate a detection signal when the at least one battery cell is connected to the battery port. Further, the control module comprises a switching module configured to connect the input port and the first battery port, a conversion module configured to connect to the switching module to receive a signal indicative of an electrical characteristic, and to generate status signals indicative of a charging status. A feedback module is configured to be associated with the conversion module to receive the status signals and to generate a drive signal for controlling input from the external power supply. A processor module is configured to be associated with the detection module to receive the detection signal. The conversion module receives the status signals, and the feedback module receives the drive signal. The processor generates control signals to control and terminate charging of the battery cells.

BRIEF DESCRIPTION OF THE DRAWINGS

The above-mentioned and other features of the invention will now be described with reference to the drawings of a preferred embodiment of the present power management module and its applications. The illustrated embodiment is intended to illustrate, but not to limit the invention. The drawings contain the following figures.

DETAILED DESCRIPTION OF THE PREFERRED EMBODIMENT

The invention relates to mobile and portable electronic devices, such as cordless or cellular phones. Although the present invention is described in greater detail in connection with cellular phones, it is contemplated that the present invention is also applicable in other systems, for example, in receivers for a navigation system (Global Positioning System, GPS) or in portable computers. In these mainly battery operated systems, efficient management of available power is of significant importance. Furthermore, the following description focuses on aspects relating to power management in a portable phone. However, it is contemplated that a portable phone performs a variety of other functions, such as transmitting and receiving signals, and encoding and decoding of signals, which will not be described herein.

Figure 1:
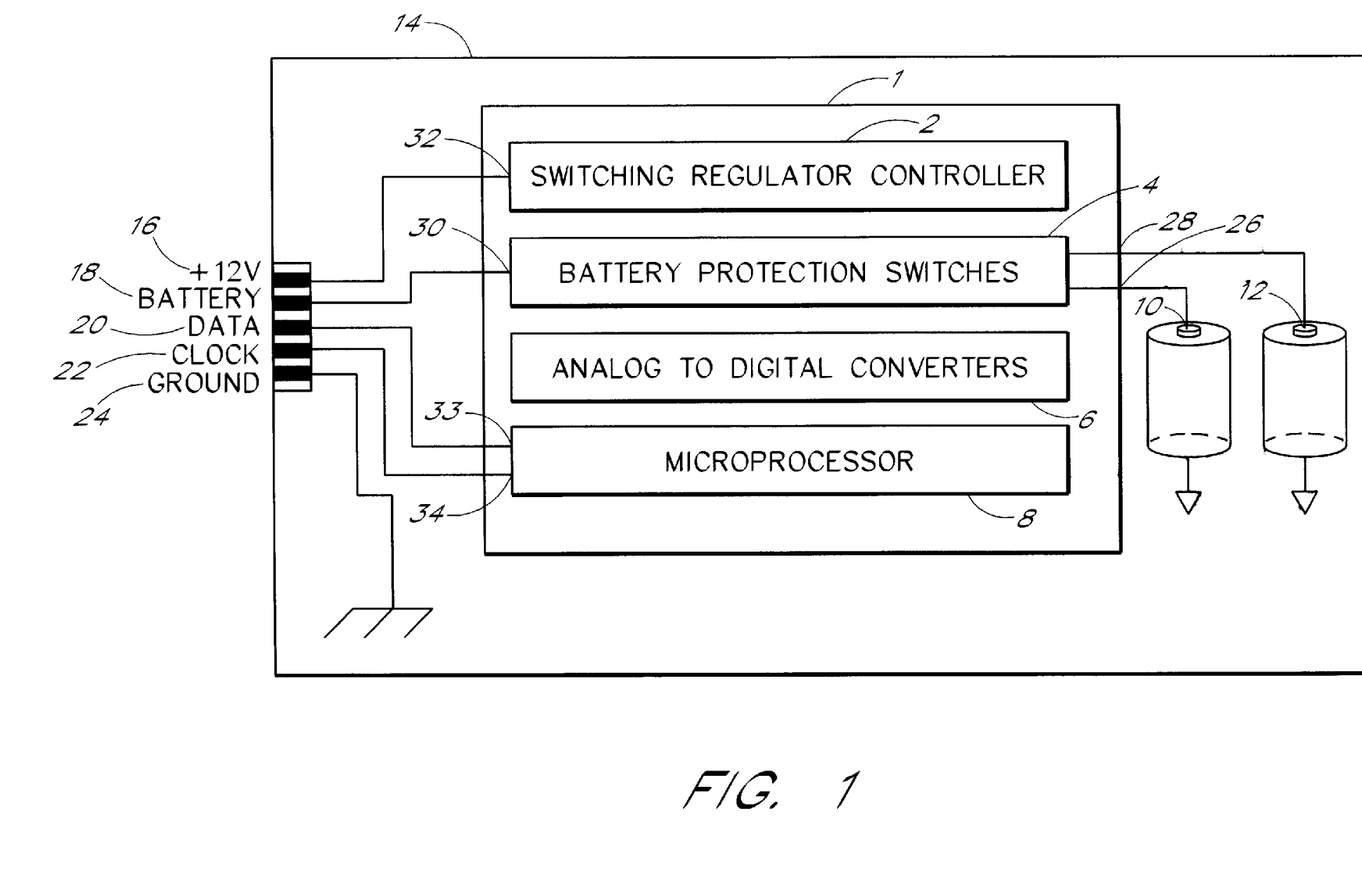
FIG. 1 illustrates a first application of a battery management module, shown as a block diagram, in a battery pack.

FIG. 1 illustrates a first application of a battery management module, which performs a function generally referred to as power management system, shown as a block diagram, in a battery pack 14. Preferably, the battery pack 14 can be used in battery-operated systems such as cellular phones. The battery pack 14 has ports 16–24 for connecting the battery pack 14 to other components of the cellular phone and/or to an external power supply. A voltage supply (+12 volts) can be connected to port 16, and port 24 is connected to ground. The port 20 is an input/output port (DATA) for data signals, and the port 22 receives a clock signal (CLOCK).

In the illustrated embodiment and as described hereinafter, the battery pack 14 includes two battery cells 10, 12 which may be of NiMH, NiCd or Li-Ion types. However, those skilled in the art will appreciate that the battery pack 14 can have one or more than two battery cells. Typically, NiCd and NiMH cells have a terminal voltage of about 1.2 volts and a dead voltage point of about 1.0 volt. NiCd and NiMH cells have an internal resistance of about 13 milliohms and are charged with a constant current. Li-Ion cells have a higher terminal voltage of about 4.1 volts and a dead voltage point of about 2.95 volts. The internal resistance is in the range of about 60 to 80 milliohms. Li-Ion cells can be charged with a combination of a constant current and a constant voltage. First, a constant current charges the Li-Ion cell until a predefined voltage is achieved. Then, the current changes to maintain the achieved voltage constant. The battery pack 14 further includes a battery management module 1 to which the cells 10, 12 and the ports 16–24 are connected.

The battery management module 1 includes functional modules which are schematically illustrated as a microprocessor 8, analog-to-digital converters (A/D converters) 6, battery protection switches 4 and a switching regulator controller 2. Hereinafter, the term module is used to refer to an electronic circuit or functional element such as a computer routine which performs a desired function. Such a module may be an isolated circuit on a motherboard, or a sub-circuit of an integrated circuit or firmware or implemented in software.

The battery cells 10, 12 are connected to the battery protection switches 4 via ports 26, 28. A port 30 of the battery protection switches 4 is connected to the port 18 (BATTERY) of the battery pack 14. The microprocessor 8 has a port 33 for connecting to the DATA port 20 and a port 34 for connecting to the CLOCK port 22.

Figure 2:
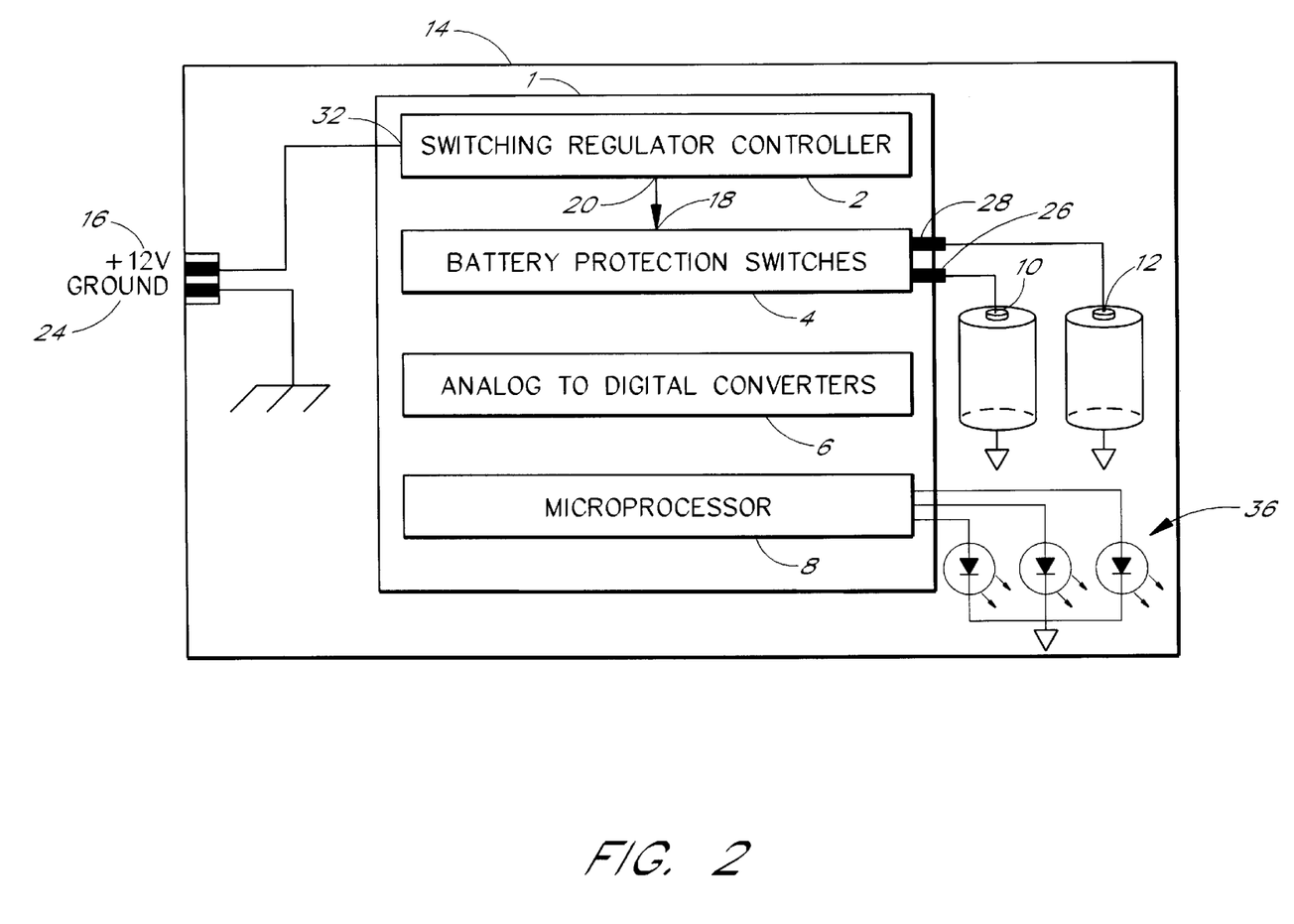
FIG. 2 illustrates a second application of a battery management module, shown as a block diagram, in a battery charging system.

FIG. 2 illustrates a second application of a battery management module 1, shown as a block diagram, in a battery charging system 14. Components having same or similar functions as those shown in FIG. 1 have same reference numerals. The battery charging system can be an individual (stand-alone) charging station for one or more battery cells. In the illustrated embodiment, the battery charging system 14 comprises two battery cells 10, 12 which are connected to ports 26, 28 of the charging system 14, respectively. As explained above, the battery cells 10, 12 may be of NiMH, NiCd or Li-Ion types. The charging system 14 has a port 16 for connecting to a voltage supply (+12 volts) and a port 24 for connecting to ground.

Similar to FIG. 1, the battery management module 1 of FIG. 2 includes functional modules which are schematically illustrated as a microprocessor 8, analog-to-digital converters (A/D converters) 6, battery protection switches 4 and a switching regulator controller 2. The ports 26, 28 of the charging system 14 are connected to the battery protection switches 4. The switching regulator controller 2 has a port 20 which is connected to a port 18 of the battery protection switches 4.

The charging system 14 detects when a battery cell is placed into a slot which can receive one or more battery cells, and further comprises a display 36 which is connected to and controlled by the microprocessor 8. When a battery cell is connected to the charging system, the display 36 indicates, for example, that the charging system 14 is currently charging the battery cells 10, 12, and that the battery cells 10, 12 are not yet fully charged, or that the battery cells 10, 12 are fully charged and that the charging has stopped.

The battery management system is implemented as a single integrated circuit (IC) on one chip whereby the complexity of the energy management circuitry in portable phones is advantageously reduced. Hereinafter, the IC for the battery management system is referred to as the BMIC. Because the battery management system can be implemented as an IC, the complexity, and also, the size can be reduced, further reducing the size of cellular phones.

As explained below in greater detail, the functional modules shown in FIGS. 1 and 2 are integrated in the BMIC. For example, the integrated microprocessor 8 is a 8-bit microprocessor having, inter alia, an 8-bit general purpose input/output port, an on-chip RC/crystal oscillator for 32.768 kHz, and a watch-dog timer. The microprocessor 8 is, for example, a Rockwell 6502 microprocessor. Further details of the microcontroller can be obtained from the corresponding data sheets.

The battery management module 1 according to the invention can be used for battery cells 10, 12 independently from their battery chemistry (Li-Ion, NiCd, NiMH). Several charging options help to extend battery life. For NiCd and NiMH battery cells, the battery management system implemented in the module 1 has an advanced charge termination feature. The termination feature is implemented as a software program and stored and executed in the microcontroller 8. During charging a battery cell, the terminal voltage does not increase linearly as a function of charge time. Rather, the terminal voltage decreases within a first charging interval before the terminal voltage increases significantly within a second charging interval. Starting at a voltage inflection point, the terminal voltage increase is reduced within a third charging interval until the terminal voltage reaches its maximum value at a zero voltage slope point. Depending on the resolution used for measuring the terminal voltage, e.g., a 10 millivolts or 2 millivolts resolution, different increases of the internal cell temperature are detected. For example, when the zero voltage slope point is detected, a resolution of 10 millivolts results in a temperature increase of about 8 to 10 degrees Celsius. When the voltage inflection point is detected, a resolution of 10 millivolts results in a temperature increase of about 6 to 8 degrees Celsius, and a resolution of about 3 millivolts results in a temperature increase of only 2 to 3 degrees. Therefore, determining when the charging has to be stop is important to maintain the increase of the internal battery cell temperature as low as possible.

Additionally, the battery management system has a de-crystallization feature for NiCd cells, as described below with reference to FIG. 4.

The battery management module 1 charges Li-Ion battery cells in a combined constant current/constant voltage process. At a charge rate of about 1 C (charging rate; at 600 milliamperes per hour 1 C equals 600 milliamperes), it takes about 2 to 3 hours to charge the Li-Ion battery cells, wherein the constant current portion takes about one hour. The terminal voltage is measured under charge.

Alternatively, a pulsed constant current can be applied. Then, at a charge rate of about 1 C, it takes about one hour to charge the Li-Ion cells. With the pulsed constant current, the terminal voltage is measured without a load.

Figure 3:
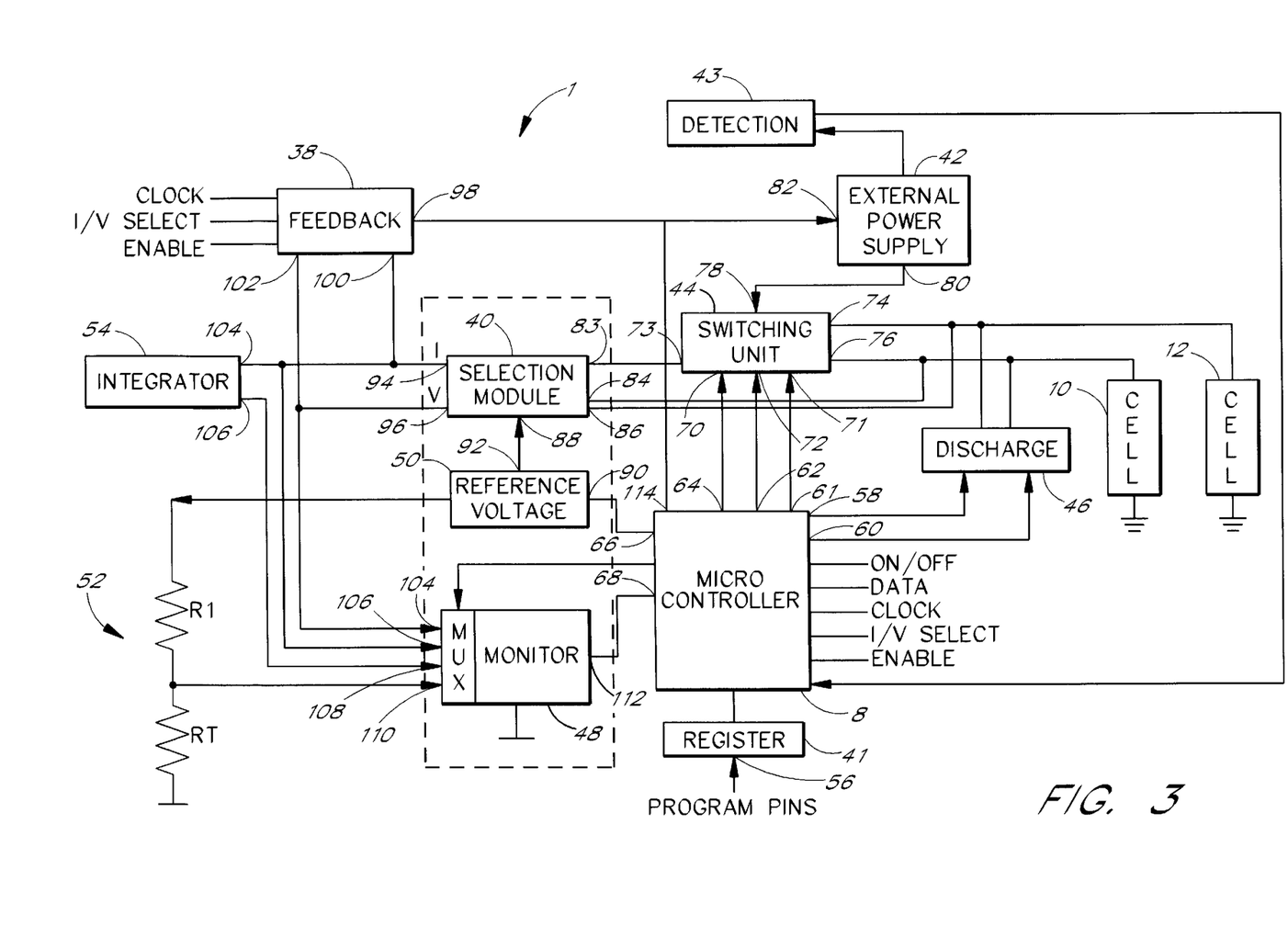
FIG. 3 illustrates a third application of a battery management module connected to an external power supply and to two battery cells and operable in a cellular phone.

FIG. 3 shows a schematic embodiment of a battery management module 1 shown in FIGS. 1 and 2, which is suitable for integration on a single chip. For illustrative purposes, the battery management module 1 is connected to the battery cells 10, 12 and to an external power supply 42. However, it is contemplated that the external power supply 42 and the battery cells 10, 12 are not included in the battery management module 1. Advantageously, the battery management module 1 can operate in a charging mode (see FIG. 2) and in a battery pack mode (see FIG. 1). For example, the battery management module 1 has a detection module 43 which recognizes if the external power supply 42 is connected to the cellular phone. Then, the microcontroller 8 initiates switching the module 1 automatically from the battery pack mode to the charging mode. The external power supply 42 may be associated with a car battery or a voltage transformer which is connected to a 120/240 volts power line. Usually, the external power supply 42 is designed as a stand-alone charging station to which the cellular phone is placed when charging is required or when the cellular phone is not in use.

As an alternative to placing the battery management module 1 in a cellular phone, the battery management module 1 may be located within a charging station. Such a charging station may have a port for receiving a cellular phone, and a port for receiving a spare battery pack.

Placed in a cellular phone, the battery management module 1 recognizes if the cellular phone is removed from the charging station, and switches automatically to the battery pack mode during which the battery cells 10, 12 provide the energy required to operate the cellular phone. As soon as the cellular phone is placed back to the charging station, the battery management module 1 switches to the charging mode.

As explained above, the battery management module, i.e., the BMIC 1, includes the 8-bit microcontroller 8 which is associated with a non-volatile register 41. The register 41 has program lines 56 which end as program pins on the BMIC 1. The program pins permit programming of the BMIC externally for a specific application. For example, two pins are used to select a specific voltage (e.g., 1.2 volts, 2.4 volts, 3.6 volts or 4.8 volts). A further pair of pins is used to select the type of battery cells (Li-Ion, NiCd or NiMH) to which the BMIC 1 is connected, and another pair of pins is used to select the operation and application mode for the BMIC. That is, the BMIC can be used inside a cellular phone, in a battery pack supervisor module or in a desktop battery charger for one or two batteries. Other program pins available on the BMIC can be used to define the BMIC as a "master" or "slave", and for switching the BMIC from a test mode to a normal operational mode. Advantageously, for some applications, the program pins can be used to program the charge rate of battery cells.

The microcontroller 8 has ports for an ON/OFF signal, a signal I/V for selecting current or voltage evaluation, a data signal DATA and a clock signal CLOCK for communications with external components of the cellular phone. The ports for the data signal DATA and the clock signal CLOCK provide a standard interface. The interface is adapted to communicate with a System Management Bus (SMBus) as defined by INTEL. Details regarding this SMBus can be obtained from "System Management Bus Specification", Revision 1.0, Feb. 15, 1995, Intel Corporation. Via this interface, the microcontroller 8 can communicate with a central processor (not shown). When the BMIC is used in a cellular phone, the microcontroller 8 may be the "slave" and a central processor for the phone may be the "master" that controls the operation of the cellular phone. When the BMIC is used in a stand-alone battery pack charger, the microcontroller 8 operates as "master" and the data port DATA of the interface is used to drive a display (see FIG. 2).

The microcontroller 8 has output ports 58, 60 connected to a discharge module 46 which is connected to each of the battery cells 10, 12. During the charging mode, the microcontroller 8 periodically activates the discharge module 46 whereby the battery cells 10, 12 are periodically discharged for a certain percentage. While in use, crystal formation occurs on surfaces of the Nickel plates of the battery cells 10, 12. This crystal formation causes a reduced charge capacity and is known as "memory effect". Through the periodic discharging, $O_2$-molecules are dislodged from the surfaces of the Nickel plates whereby the effective plate surface is increased. Through this periodic discharging, the memory effect is reduced significantly.

Figure 4:
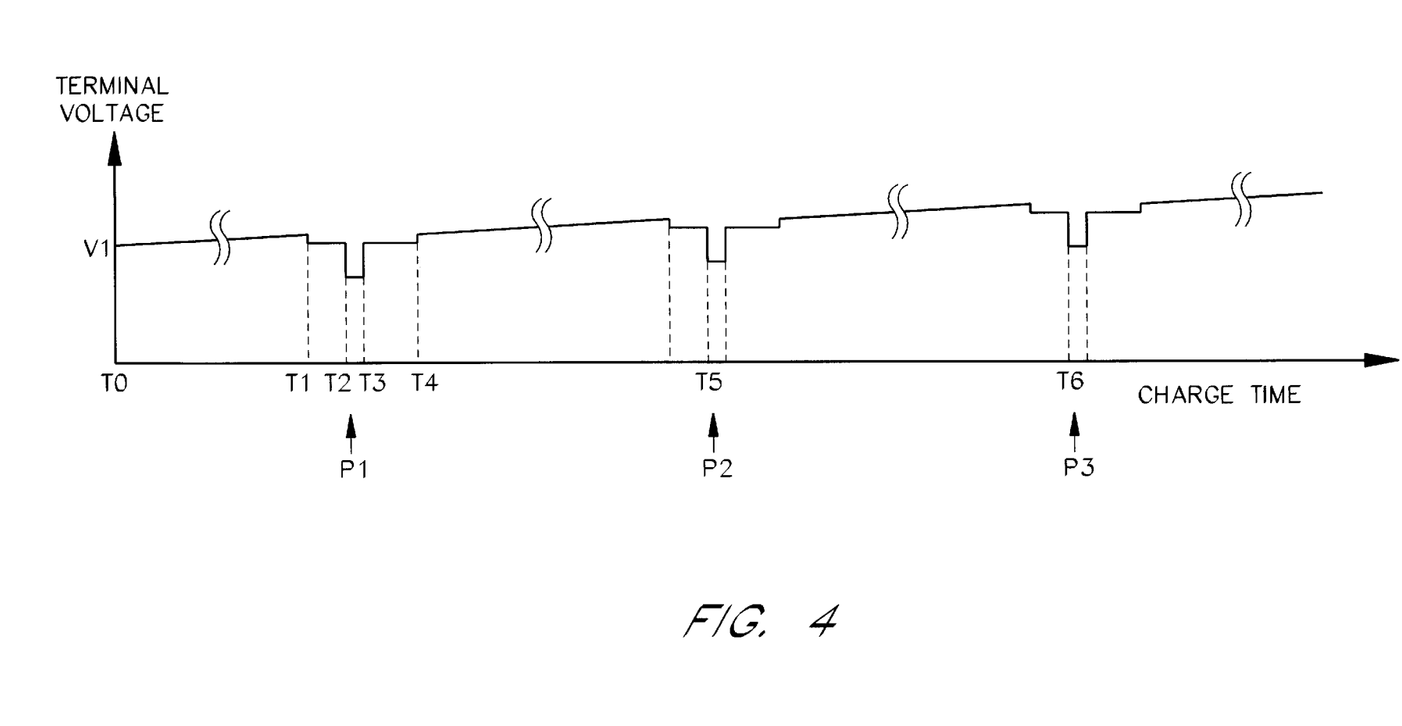
FIG. 4 is a graph to illustrate the process of charging a battery cell.

FIG. 4 shows a graph of the terminal voltage of a battery cell 10, 12 as a function of the charge time to illustrate the periodic discharging. The graph shows three exemplary discharge pulses P1, P2, P3. At the beginning, for example, at time T0, the battery cell has a terminal voltage V1 which increase until a rest period starts at time T1. During the rest period no charging occurs and the terminal voltage drops but remains constant after this drop, until the first pulse P1 starts at time T2. The pulse duration is approximately a few milliseconds. The discharge module 46 is only activated for NiCd and NiMH cells, and provides a discharging pulse that corresponds to about 1% of the charging current. At time T3 the pulse P1 ends and the terminal voltage increases to its pre-pulse value. This pre-pulse value is measured in a measurement period between time T3 and T4. After the measurement period a terminal period follows during which charging continues and the terminal voltages increases further. The discharging pulse is preferably repeated, for example, at time T5, T6, once every 3 to 5 seconds depending on the charge rate. For example, for a 900 milliamperes per hour battery cell which is charged with a charging rate of 1 C (900 milliamperes), the discharge current would be set to 2.3 amperes and would last 15 msec having a repetition rate of 5 seconds. This is often referred to as "burping" the battery.

As shown in FIG. 3, the microcontroller 8 has output ports 61, 62, 64 connected to input ports 70, 71, 72, respectively, of a module 44 of battery protection circuits and battery switches (switching unit). The module 44 has an output port 76 which is connected to the battery cell 10, and an output port 74 which is connected to the battery cell 12. A further input port 78 of the module 44 is connected to an output port 80 of the external power supply 42. Under control of the microcontroller 8, the module 44 protects the battery cells 10, 12 and switches the BMIC of a cellular phone between the charging mode and the battery mode.

The output ports 74, 76 of the module 44 are also connected to input ports 84, 86, respectively, of a selection module 40 which includes a multiplexer, resistive attenuators and differential amplifiers. During the charging mode, an output port 94 of the selection module 40 provides an analog signal that is indicative of a current value (I) corresponding to a present charge current. During the battery pack mode, an output 96 of the selection module 40 provides an analog signal indicative of a voltage value (V) corresponding to a present voltage of the battery cells 10, 12. These two output ports 94, 96 are connected to input ports 104, 106, respectively, of a monitor module 48 which has further inputs 108, 110 for a signal indicative of the surrounding temperature and/or temperature changes, and a signal indicative of an average current consumption.

The monitor module 48 comprises a multiplexer (MUX) which is associated with the inputs ports 104, 106, 108, 110, and an analog-to-digital converter (A/D converter). The microcontroller 8 controls the multiplexer to output one of the input signals. The A/D converter converts the output analog signal into a digital signal which is input to the microcontroller 8. The monitor module 48 has an output port 112 which is connected to an input port 68 of the microcontroller 8 which uses the signals from the monitor module 48 to generate control signals for the internal components and data signals to be output at the port DATA. By controlling the multiplexer, the microcontroller 8 polls the temperature, the current, the voltage or the average current consumption, or a combination thereof. For example, the microcontroller 8 can disconnect the battery cells 10, 12 if the current exceeds an upper threshold, and if the voltage is below a lower threshold or above an upper threshold.

The signal indicative of the surrounding temperature is generated by a voltage divider 52 which is connected to ground and to a reference voltage source 50 which provides a reference voltage. The voltage divider has a resistor R1 and a temperature dependent resistor RT. The resistor RT may have either a positive or negative temperature coefficient. A voltage across the resistor RT is dependent on the surrounding temperature, i.e., a certain voltage drop corresponds to a certain temperature. Because the capacity and the voltage of a battery cell is a function of the temperature, the BMIC 1 adapts the charging and battery pack modes to the surrounding temperature for improved accuracy. Further, if the temperature is out of a predefined range, the microcontroller 8 can disconnect the battery cells 10, 12.

The selection module 40, the reference voltage source 50 and the monitor module 48 form the A/D converter 6 shown in FIGS. 1 and 2.

The BMIC 1 further includes a feedback module 38 having an input port 100 which is connected to the output port 94 of the selection module 40 and to the input port 106 of the monitor module 48. Another input port 102 of the feedback module 38 is connected to the output port 96 of the selection module 40 and to the input port 104 of the monitor module 48. Furthermore, the feedback module 38 has input ports for the clock signal CLOCK, a select signal I/V-SELECT originating from the microcontroller 8, and an enable signal ENABLE originating from the microcontroller 8. Via the enable signal ENABLE, the microcontroller 8 activates the feedback module 38, and via the select signal I/V-SELECT, the microcontroller 8 chooses if the voltage (V) or the current (I) shall be used within the feedback module 38 depending on the present mode, battery pack or charging mode. An output port 98 of the feedback module 38 is connected to an input port 82 of the external power supply 42 and to an input port 114 of the microcontroller 8. The feedback module 38 generates a control signal that is used to control a driver included in the external power supply 42. The control signal advantageously is a saw tooth shaped signal that is used to control the ON/OFF cycle (pulse width) of a circuit included in the external power supply 42. By controlling the pulse width the average DC voltage or DC current can be adjusted.

Another module, an energy averaging module 54 (integrator) has an input port 104 which is connected to the output port 94 of the selection module 40, and an output port 106 which is connected to the input port 108 of the monitor module 48. The averaging module 54 integrates the analog signal which corresponds to the charging current over a certain time interval and provides this integral value via the monitor module 48 to the microcontroller 8. The microcontroller 8 uses this value to calculate the momentarily needed charge based on the current usage and how much energy was drawn from the batteries.

An input port 90 of the reference voltage source 50 is connected to a port 66 of the microcontroller 8, and an output port 92 is connected to an input port 88 of the selection module 40. The reference voltage source 50 provides a reference voltage, for example, of about 1.2 volts. Under control of the microcontroller 8 the reference voltage source 50 can be turned on and off to selectively feed the reference voltage to the selection module 40 and to the voltage divider R1, RT.

Figure 5:
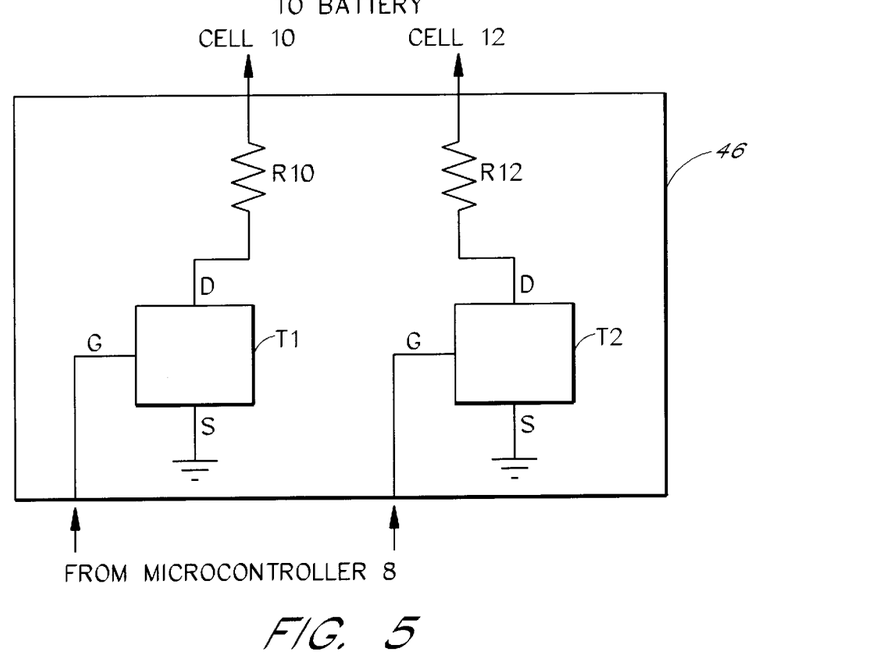
FIG. 5 illustrates an embodiment of a discharging module.

The FIGS. 5–7 and 9 show embodiments of the modules shown in FIG. 3. FIG. 5 is an embodiment of the discharge module 46 which includes two field effect transistors T1, T2, each having a gate G, a drain D and a source S terminal. Both gates G of the transistors T1, T2 are connected to output ports of the microcontroller 8, and both sources S are grounded. Between the drain D of the transistor T1 and the battery cell 10 there is a resistor R10 to limit the discharge current. Also, between the drain of the transistor T2 and the battery cell 12 there is a resistor R12 to limit the discharge current. When the microcontroller 8 activates the discharge module 46 by applying a voltage to each gate G, the path between the drain D and source S of each transistor T1, T2 becomes conducting and the discharge current flows from the battery cells 10, 12 to ground. The transistors are operated between ON and OFF and have a typical ON resistance of less than 200 milliohms. Thus, the discharge current is limited only by the resistors R10, R12.

Figure 6:
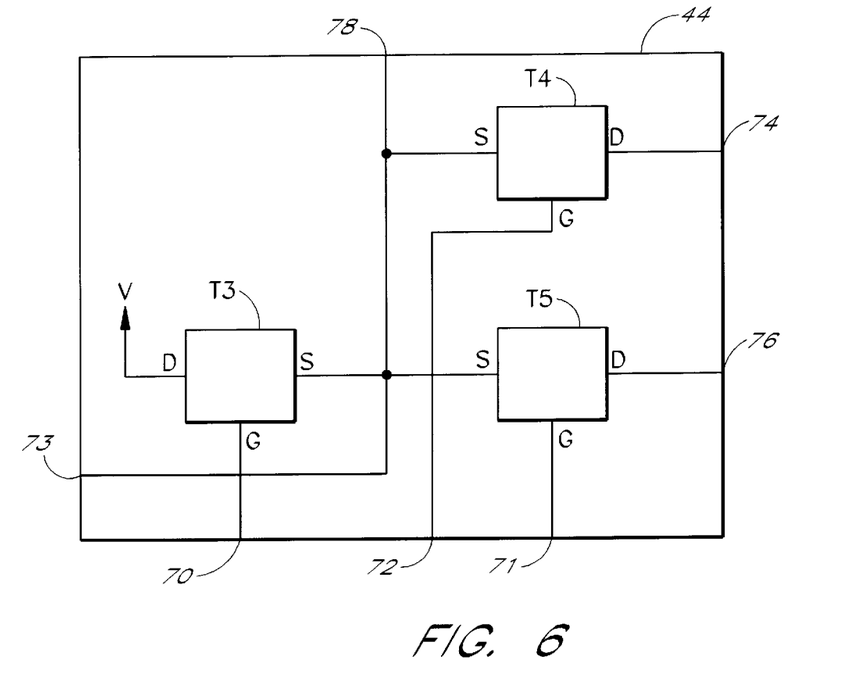
FIG. 6 illustrates an embodiment of a module with battery protection switches.

FIG. 6 shows an embodiment of the module 44 of battery protection switches. In the illustrated embodiment, the module 44 includes three field effect transistors T3, T4, T5, each having a gate G, a drain D and a source S terminal. Each gate G is connected to the microcontroller 8: the gate G of the transistor T3 via the port 70, the gate G of the transistor T4 via the port 72 and the gate G of the transistor T5 via the port 71 of the module 44. Further, all sources S are connected to the ports 78, 73 of the module 44. The drain D of the transistor T4 is connected to the battery cell 12 via the output port 74, and the drain D of the transistor T5 is connected to the battery cell 10 via the output port 76 of the module 44. And the drain of the transistor T3 is connected to a terminal voltage. The transistors T3, T4, T4 are low-loss P-channel field effect transistors with an "ON" resistance between drain and source of less than about 100 milliohms.

Figure 7:
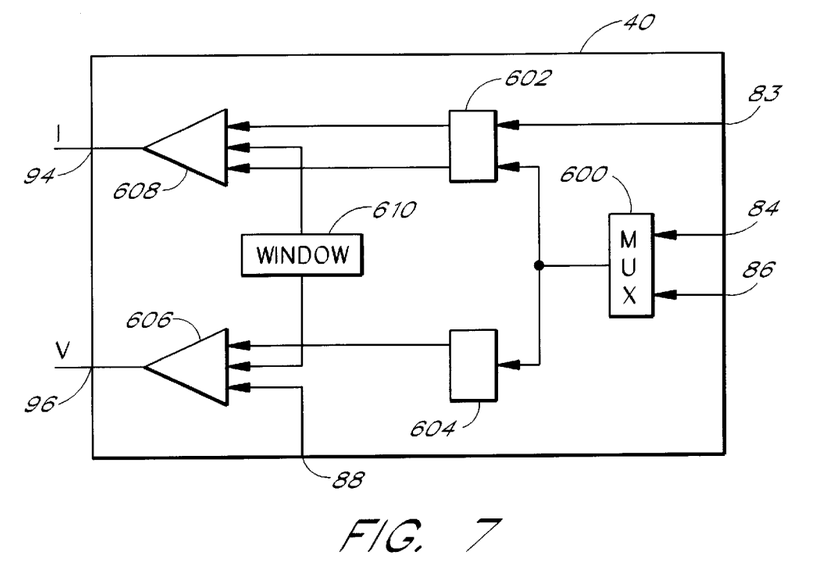
FIG. 7 illustrates an embodiment of a selection module.

FIG. 7 illustrates an embodiment of the module 40. In the illustrated embodiment, a first input of a multiplexer 600 is connected to the port 84 of the module 40 and a second input of the multiplexer 600 is connected to the port 86 of the module 40. The multiplexer inputs are connected to the battery cells 10, 12, respectively (and the drain D terminals of the transistors T4, T5 shown in FIG. 6). By controlling the multiplexer 600, the microcontroller 8 can select one of the inputs to be switched through to an output which is connected to a first input of a first attenuator 604 and to a first input of a second attenuator 602. A second input of the second attenuator 602 is connected to the port 83 of the module 40. This port 83 is connected to port 73 (and all source S terminals of the module 44 shown in FIG. 6). The second attenuator 602 therefore receives two signals having a voltage difference that corresponds to the voltage drop between the drain and the source of the transistor T4 shown in FIG. 6. The second attenuator 602 attenuates the two signals evenly to be within a predetermined voltage range.

The second attenuator 602 has two outputs that are connected to two inputs of a first summing amplifier 608 which has a third input for an offset value generated by an offset module 610 (window) which is also comprised in the module 40. An output of the first amplifier 608 is connected to the port 94 of the module 40 which outputs a digital signal indicative of the charge current.

The second attenuator 604, which also attenuates the voltage at a predetermined value, has one output which is connected to first input of a second summing amplifier 606 which has a second input for the offset value and a third input, connected to the port 88, for a reference voltage. An output of the second amplifier 606 is connected to the port 96 of the module 44 which outputs a digital signal indicative of the terminal voltage of one of the battery cells 10, 12. That is, in the battery pack mode, the transistors T4, T5 shown in FIG. 6 are "OFF" and both terminal voltages are input to the multiplexer and alternatingly switched through to the multiplexer output.

Figure 8:
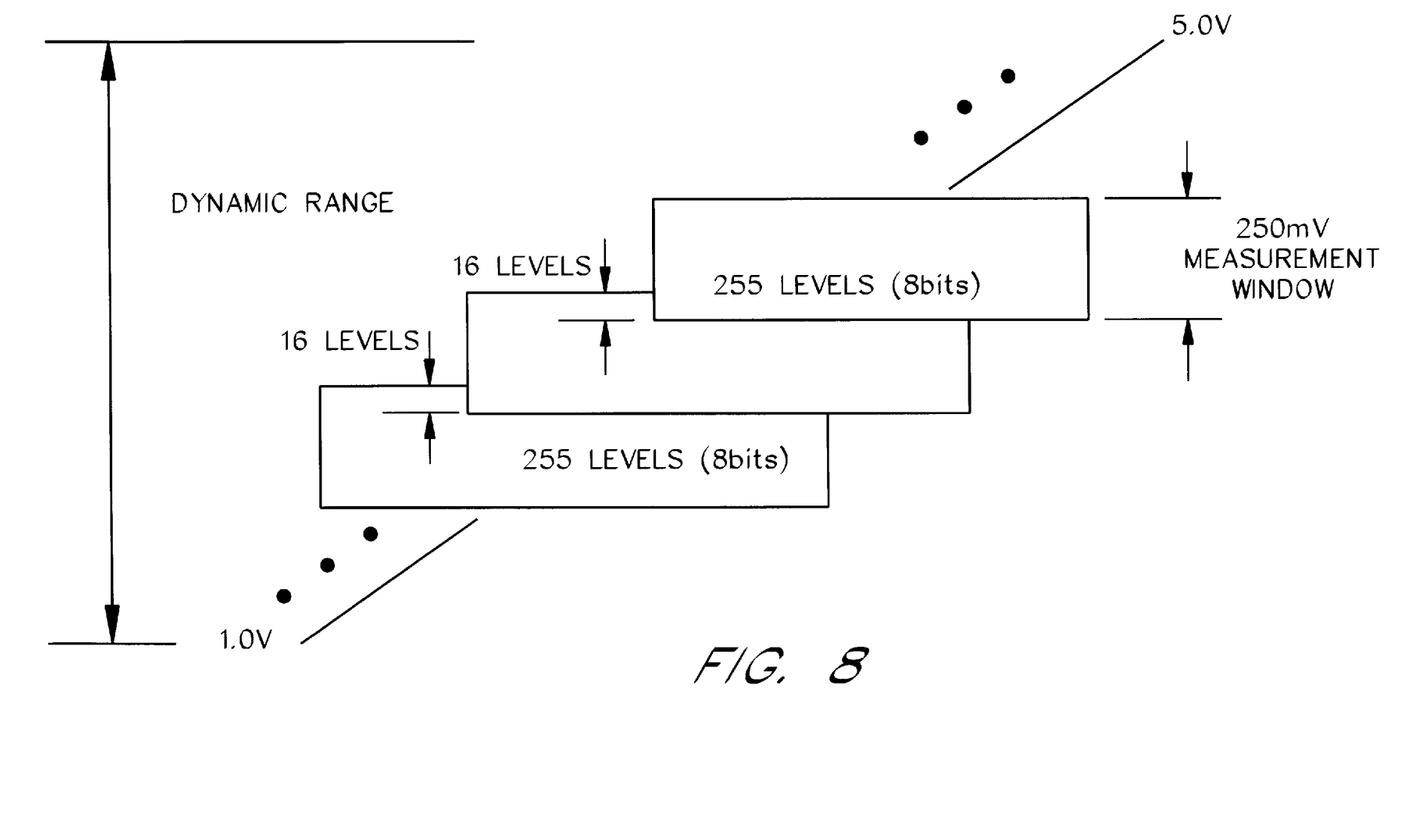
FIG. 8 is a graph illustrating a windowing method used in the battery management module.

The operation of the offset module 610 is explained with reference to FIG. 8 which illustrates a windowing concept applied by the battery management module 1. The battery management module 1 has a dynamic range between about 1 volt and 5 volts within which the power management module 1 is operable. As indicated in FIG. 8, this dynamic range is divided into a number of subranges, hereinafter called windows. The minimum number of windows in the present embodiment is approximately 20, however, a typical number of windows is 32. The windows can overlap, and each window has a maximum opening corresponding to about 250 millivolts.

The offset module 610 is controlled by the microcontroller 8 which has an 8-bit resolution. That is, with 8 bits, each window is divided into 255 levels and the windows are adjusted to overlap approximately 16 levels.

The microcontroller 8 measures the current or voltage indicative signal (I, V), via the monitor module 48 shown in FIG. 3, within one window. When the microcontroller 8 detects that the measured signal reaches an upper or lower limit of the window, the microcontroller 8 controls the offset module 610 to input a positive or negative offset value to the summing amplifiers 606, 608, the measured signal is shifted into an adjacent window. Because the microcontroller 8 is able to detect that a signal reaches a measurement limit, an early switching into another window is possible which increases accuracy of the battery management system implemented in the battery management module 1.

Figure 9:
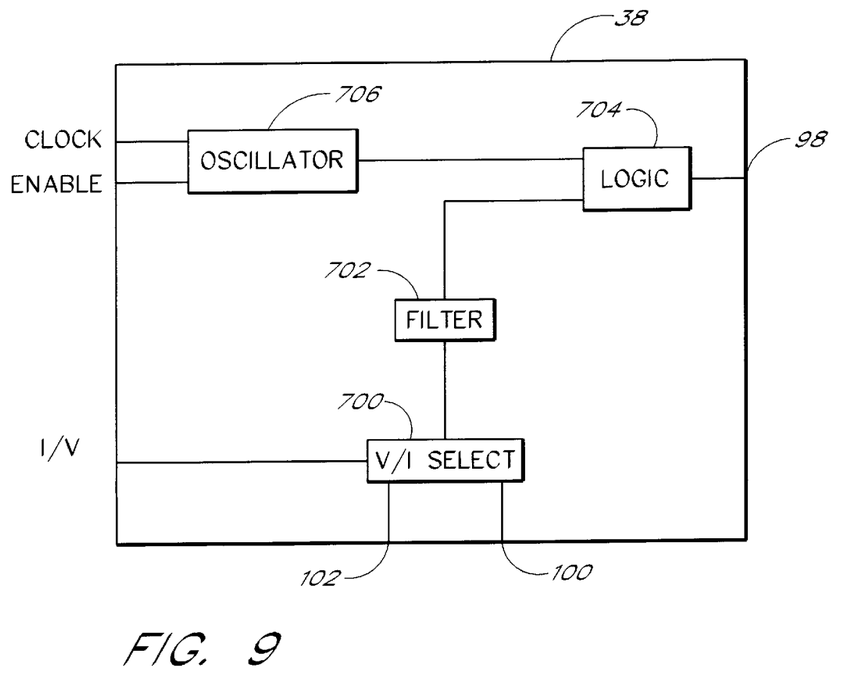
FIG. 9 illustrates an embodiment of a feedback module.

FIG. 9 shows an embodiment of the feedback module 38 which is connected, via the port 98, to the external power supply 42, and, via the ports 100, 102, to the selection module 40 and to the monitor module 48. A selector 700, controllable through a V/I SELECT signal from the microcontroller 8, has two inputs for the current and voltage indicative signals (I, V). The selector 700 selects one of these signals and feeds this selected signal to a low pass filter 702 which blocks any AC component overlaying the current and voltage indicative signals. The filter 702 has an output which is connected to a first input of a logic device 704. A second input of the logic device 704 is connected to an oscillator 706, which receives the CLOCK signal and the ENABLE signal from the microcontroller 8.

The described BMIC of the present invention can be programmed to allow charging of either NiCd, NiMH or Li-Ion battery cells. The programmability also permits implementation of an advanced charge termination algorithm. Further, BMIC performs a plurality of tasks, inter alia, battery protection, charging, fuel gauge and communications with the central processor which are required for new generations of cellular phones. The BMIC allows an efficient implementation of these features without increasing the complexity of the cellular phone.

Although an exemplary embodiment of the invention has been disclosed for purposes of illustration, it will be understood that various changes, modifications and substitutions be incorporated in such embodiment without departing from the spirit of the invention as defined by the claims which follow.

What is claimed is:

1. A control module for controlling battery cells, the control module being implemented as a single integrated circuit and comprising:

a first port, the first port being configured to connect to a first battery cell;

an input port, the input port being configured to connect to an external power supply;

a detector module, the detector module configured to generate a detection signal when the external power supply is connected to the input port;

a switching module, the switching module configured to connect to the input port and the first battery port and to select one of said ports;

a selection module, the selection module configured to connect to the switching module to receive a signal indicative of an electrical characteristic, and to generate status signals indicative of a charging status;

a feedback module, the feedback module configured to be associated with the selection module to receive the status signals and to generate a drive signal for controlling input from the external power supply; and a processor module, the processor module associated with the detection module to receive the detection signal, with the selection module to receive the status signals and with the feedback module to receive the drive signal, and to generate control signals to control and terminate charging of the battery cells.

2. The control module of claim 1, further comprising a second port, the second port configured to connect to a second battery cell.

3. The control module of claim 1, further comprising a sensor port for receiving a temperature sensor, the temperature sensor configured to generate a signal indicative of temperature, and to be associated with the processor module receiving the temperature indicative signal.

4. The control module of claim 3, wherein the temperature sensor comprises a resistor, the resistor having a temperature dependent resistance.

5. The control module of claim 3, further comprising an averaging module configured to receive one of the status signals and to generate a signal indicative of average current consumption, the averaging module further configured to be associated with the processor module which receives the signal indicative of the average current consumption.

6. The control module of claim 1, further comprising a discharge module, the discharge module coupled to the processor module and the first battery cell, said discharge module configured to periodically discharge the first battery cell.

7. The control module of claim 6, wherein the periodic discharge occurs at a preset level which is about one percent of a charge current.

8. The control module of claim 7, wherein the discharge module is configured to discharge the first battery cell about once every 3 to 5 seconds.

9. The control module of claim 6, wherein the discharge module comprises a first and second transistor, each transistor being controlled by the processor module to operate between an on-state and an off-state, wherein in the on-state, the first and second transistors are configured to connect the first battery cell to ground.

10. The control module of claim 2, wherein the switching module comprises a first and second transistor, each transistor being controlled by the processor module to operate between an on-state and an off-state, wherein in the on-state, the first transistor is configured to connect the first battery cell to the first port, and the second transistor is configured to connect the second battery to the input port.

11. The control module of claim 10, wherein the switching module further comprises a third transistor, the third transistor being interconnected between the second transistor and a voltage terminal, and being controlled by the processor module.

12. The control module of claim 1, further comprising a register for storing data defining operation modes of the control module.

13. The control module of claim 1, wherein the selection module comprises a selection module and a monitor module, the selection module configured to generate a signal indicative of a charge current and a signal indicative of a voltage value, the monitor module configured to input the status signal to the processor module.

14. The control module of claim 13, wherein the monitor module comprises a multiplexer and an analog-to-digital converter, the multiplexer configured to select under control of the processor module one of the status signals and the analog-to-digital converter configured to convert the selected status signal into a digital signal.

15. The control module of claim 13, wherein the selection module comprises an offset module configured to provide under control of the processor module a positive and a negative offset value selectively.

16. A charging station for a battery cell, comprising:

a power port configured to connect the station to an external power supply;

a battery port configured to connect to at least one battery cell;

a display configured to indicate a charging status of the battery cell; and a control module configured to control the at least one battery cell, the control module being implemented as a single integrated circuit and comprising:

a first port, the first port being configured to connect to the at least one battery cell;

an input port, the input port being configured to connect to the external power supply;

a detector module, the detector module configured to generate a detection signal when the at least one battery cell is connected to the battery port;

a switching module, the switching module configured to connect the input port and the first battery port;

a selection module, the selection module configured to connect to the switching module to receive a signal indicative of an electrical characteristic, and to generate status signals indicative of a charging status;

a feedback module, the feedback module configured to be associated with the selection module to receive the status signals and to generate a drive signal for controlling input from the external power supply; and a processor module, the processor module associated with the detection module to receive the detection signal, with the selection module to receive the status signals and with the feedback module to receive the drive signal, and to generate control signals to control and terminate charging of the battery cells.

17. A battery pack comprising a battery cell and a control module for controlling the battery cell, the control module being implemented as a single integrated circuit and comprising:

a first port, the first port being configured to connect to the battery cell;

an input port, the input port being configured to connect to an external power supply;

a detector module, the detector module configured to generate a detection signal when the external power supply is connected to the input port;

a switching module, the switching module configured to connect to the input port and the first battery port and to select one of said ports;

a selection module, the selection module configured to connect to the switching module to receive a signal indicative of an electrical characteristic, and to generate status signals indicative of a charging status;

a feedback module, the feedback module configured to be associated with the selection module to receive the status signals and to generate a drive signal for controlling input from the external power supply; and a processor module, the processor module configured to be associated with the detection module to receive the detection signal, with the selection module to receive the status signals and with the feedback module to receive the drive signal, and to generate control signals to control and terminate charging of the battery cells.

* * * * *